United States Patent
Zhang et al.

(10) Patent No.: US 12,557,051 B2
(45) Date of Patent: Feb. 17, 2026

(54) METHODS, APPARATUS AND SYSTEMS FOR CONFIGURING TIMING ADVANCE INFORMAITON IN A WIRELESS COMMUNICATION

(71) Applicant: ZTE Corporation, Guangdong (CN)

(72) Inventors: Yang Zhang, Shenzhen (CN); Bo Gao, Shenzhen (CN); Ke Yao, Shenzhen (CN); Zhaohua Lu, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 800 days.

(21) Appl. No.: 17/853,439

(22) Filed: Jun. 29, 2022

(65) Prior Publication Data

US 2022/0330192 A1 Oct. 13, 2022

Related U.S. Application Data

(63) Continuation of application No. PCT/CN2020/076411, filed on Feb. 24, 2020.

(51) Int. Cl.
*H04W 56/00* (2009.01)
*H04L 5/00* (2006.01)
(Continued)

(52) U.S. Cl.
CPC ....... *H04W 56/0045* (2013.01); *H04L 5/0051* (2013.01); *H04W 56/001* (2013.01);
(Continued)

(58) Field of Classification Search
CPC ........... H04W 56/0045; H04W 56/001; H04W 72/21; H04W 72/0446; H04W 72/046; H04L 5/0051
(Continued)

(56) References Cited

U.S. PATENT DOCUMENTS

2019/0159156 A1* 5/2019 Abedini ............ H04W 56/0005
2019/0191399 A1  6/2019 Islam et al.
(Continued)

FOREIGN PATENT DOCUMENTS

CN  108024325 A  5/2018
CN  109089308 A  12/2018
(Continued)

OTHER PUBLICATIONS

International Search Report for priority application No. PCT/CN2020/076411 dated Dec. 1, 2020, 2p.
(Continued)

*Primary Examiner* — Intekhaab A Siddiquee
(74) *Attorney, Agent, or Firm* — Crowell & Moring LLP

(57) ABSTRACT

Methods, apparatus and systems for configuring timing advance information in a wireless communication are disclosed. In one embodiment, a method performed by a wireless communication device is disclosed. The method comprises: determining a first set of beam indications and a second set of timing advance command (TAC) values, wherein each beam indication in the first set is associated with a respective TAC value in the second set; and obtaining, for indication an uplink transmission to a wireless communication node, an indication comprising a TAC value from the second set.

16 Claims, 9 Drawing Sheets

(51) Int. Cl.
*H04W 72/044* (2023.01)
*H04W 72/0446* (2023.01)
*H04W 72/21* (2023.01)

(52) U.S. Cl.
CPC ..... *H04W 72/0446* (2013.01); *H04W 72/046* (2013.01); *H04W 72/21* (2023.01)

(58) Field of Classification Search
USPC ........................................................ 370/503
See application file for complete search history.

(56) References Cited

U.S. PATENT DOCUMENTS

2020/0029292 A1  1/2020  Zou et al.
2020/0351730 A1* 11/2020 Park .................. H04W 36/0077

FOREIGN PATENT DOCUMENTS

TW        201924420   A      6/2019
WO    WO-2013158511  A1 *  10/2013  ............. H04L 5/001
WO     WO 2018/023086 A1     2/2018
WO     WO 2018/182385 A1    10/2018
WO     WO 2019/032997 A1     2/2019

OTHER PUBLICATIONS

Written Opinion for priority application No. PCT/CN2020/076411 dated Dec. 1, 2020, 4p.
ZTE Corporation et al., "Consideration on the cell definition and NTN mobility", 3GPP TSG-RAN WG2 Meeting #104, R2-1817062, Nov. 16, 2018, 13p, US.
Substantive Examination Report dated May 29, 2024 for Indonesian Application No. P00202209581.
Extended European Search Report for corresponding application No. EP 20888537.6 dated Dec. 16, 2022, 8p.
Chinese Office Action with English translation, Sep. 12, 2024, pp. 1-21, issued in Chinese Application No. 202080082046.6, State Intellectual Property Office, Beijing, China.
Qualcomm Incorporated, Clarifications on NR time ambiguity, Aug. 26-30, 2019, pp. 1014, 3GPP RAN1 #98, R1-1909237, Prague, CZ.
Office Action issued in Australian Application No. 2020381566 dated Mar. 7, 2025 (4 pages).

* cited by examiner

METHODS, APPARATUS AND SYSTEMS FOR CONFIGURING TIMING ADVANCE INFORMAITON IN A WIRELESS COMMUNICATION

This application is a continuation of International Application No. PCT/CN2020/076411, filed Feb. 24, 2020, the entirety of which is hereby incorporated by reference.

TECHNICAL FIELD

The disclosure relates generally to wireless communications and, more particularly, to methods, apparatus and systems for configuring timing advance information in a wireless communication.

BACKGROUND

In a wireless communication following the current specs, e.g. in a fifth-generation (5G) new radio (NR) system, a timing advance (TA) mechanism is utilized to ensure that the uplink transmissions of different terminals in a same serving cell are orthogonal to avoid intra-cell interference. Therefore, a base station (BS) requires that the uplink signals from different terminals are approximately aligned when they arrive at the BS, or that the uplink signals received by the BS can all fall within the cyclic prefix (CP) in time domain.

In an existing system, uplink carriers are divided into different TA groups (TAGs) according to different serving cells. Uplink carriers of a same TAG use a same TA information, while uplink carriers of different TAGs use different TA information. As such, uplink transmissions on all uplink beams in the same serving cell will use the same timing advance command for time alignment adjustment of the uplink transmission signals. However, a serving cell may include multiple transmission/reception points (TRPs); one TRP may include multiple antenna panels; and one antenna panel may include multiple beams. Likewise, a terminal or a user equipment (UE) may comprise multiple antenna panels; an antenna panel may include multiple beams. The transmission paths experienced by the beams corresponding to different uplink carriers in the same TAG can be greatly different due to the far apart geographical locations of TRPs and/or different panel directions. Using the same timing advance value will cause some uplink beams to arrive the base station side at a time exceeding the CP, which worsens the uplink reception interference.

Thus, existing systems and methods for configuring timing advance information in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In an embodiment, a method performed by a wireless communication device is disclosed. The method comprises: determining a first set of beam indications and a second set of timing advance command (TAC) values, wherein each beam indication in the first set is associated with a respective TAC value in the second set; and obtaining, for indication an uplink transmission to a wireless communication node, an indication comprising a TAC value from the second set.

In another embodiment, a method performed by a wireless communication device is disclosed. The method comprises: receiving, from a wireless communication node, a first TAC value for scheduling a former uplink transmission of the wireless communication device in a former time slot; receiving, from the wireless communication node, a second TAC value for scheduling a latter uplink transmission of the wireless communication device in a latter time slot, wherein: the first TAC value is different from the second TAC value, the former time slot and the latter time slot are two adjacent time slots and have an overlapping slot portion.

In yet another embodiment, a method performed by a wireless communication node is disclosed. The method comprises: configuring a first set of beam indications and a second set of timing advance command (TAC) values for a wireless communication device, wherein each beam indication in the first set is associated with a respective TAC value in the second set; and generating, for an uplink transmission of the wireless communication device, an indication comprising a TAC value from the second set.

In still another embodiment, a method performed by a wireless communication node is disclosed. The method comprises: transmitting, to a wireless communication device, a first TAC value for scheduling a former uplink transmission of the wireless communication device in a former time slot; transmitting, to the wireless communication device, a second TAC value for scheduling a latter uplink transmission of the wireless communication device in a latter time slot, wherein: the first TAC value is different from the second TAC value, the former time slot and the latter time slot are two adjacent time slots and have an overlapping slot portion.

In a different embodiment, a wireless communication device configured to carry out a disclosed method in some embodiment is disclosed. In yet another embodiment, a wireless communication node configured to carry out a disclosed method in some embodiment is disclosed. In still another embodiment, a non-transitory computer-readable medium having stored thereon computer-executable instructions for carrying out a disclosed method in some embodiment is disclosed. The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
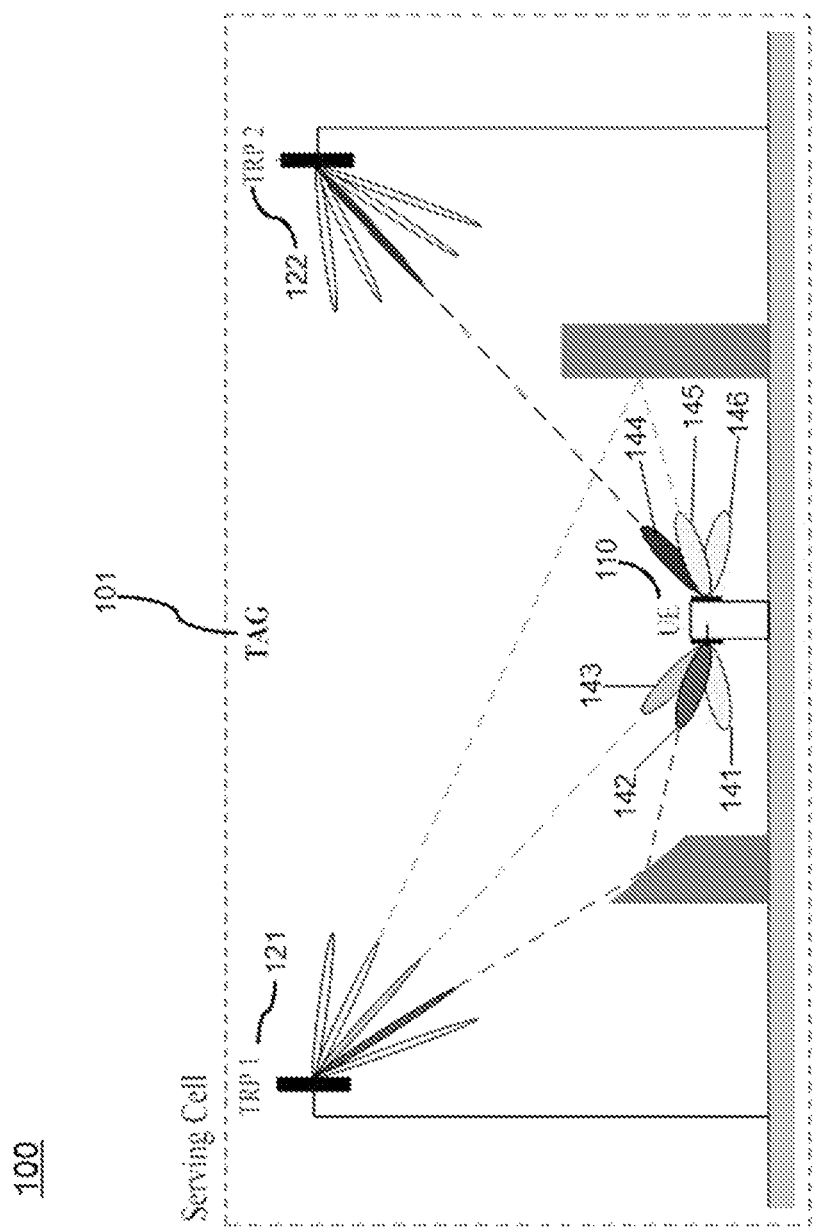
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. The radio coverage area is called a cell or a serving cell, where a wireless network may be distributed over multiple cells. The present teaching provides methods and systems for dividing a cell into several micro service areas, to achieve accurate management of wireless resources.

The present teaching discloses methods to further distinguish the timing advance values of uplink transmissions under different beams, such that the timing advance values may have a one-to-one mapping with the beam indication. Different timing advance values are utilized for uplink transmissions on different uplink beams in the same serving cell or same TAG. In one embodiment, a beam state of an uplink signal can be utilized to distinguish and indicate the timing advance information of different uplink beams, so as to adjust the timing advance (TA) of different uplink beams and solve the problem of mutual interference between uplink receptions. According to various embodiments, the beam state may be: a sounding reference signal (SRS) resource set; a spatial relation information (SRI); a quasi co location (QCL) state; a transmission configuration indicator (TCI) state; a control resource set (CORESET); a control resource set (CORESET) pool; a non-zero-power channel state information reference signal (NZP-CSI-RS) resource set; an SRS port; an antenna port; an antenna panel; a beam group, etc. A TA value corresponds to the adjustment value indicated in a TA command (TAC). In the present teachings, the terms "beam" and "beam state" will be used interchangeably to mean a transmission beam; the terms "TA value" and "TAC value" will be used interchangeably to mean a value of a timing advance.

The methods disclosed in the present teaching can be implemented in a wireless communication network, where a BS and a UE can communicate with each other via a communication link, e.g., via a downlink radio transmission from the BS to the UE or via an uplink radio transmission from the UE to the BS. In various embodiments, a BS in the present disclosure can be referred to as a network side and can include, or be implemented as, a next Generation Node B (gNB), an E-UTRAN Node B (eNB), a core network, a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a TAG 101 corresponding to a serving cell. The serving cell includes two TRPs: TRP1 121 and TRP2 122, each of which can receive uplink transmissions from a UE 110 in the serving cell. As shown in FIG. 1, the UE 110 has two antenna panels with different directions, where each antenna panel has three beams. The left panel of the UE 110 in FIG. 1 includes beams 141, 142, 143; and the right panel of the UE 110 in FIG. 1 includes beams 144, 145, 146. Due to the panel and beam directions of the TRPs 121, 122 and the UE 110, as well as the locations of the barriers between the TRPs 121, 122 and the UE 110, a subset of the uplink beams of the UE 110 can arrive at the TRPs 121, 122. For example, uplink beams 142, 143, 145 can carry uplink transmissions to TRP1 121; and uplink beam 144 can carry uplink transmissions to TRP2 122. But the transmission paths experienced by these beams 142, 143, 144, 145 corresponding to different uplink carriers in the same TAG 101 are very different, as shown in FIG. 1. As such, different TA values will be utilized for uplink transmissions on these different uplink beams 142, 143, 144, 145 in the same serving cell to avoid the mutual interference between uplink receptions.

Figure 2:
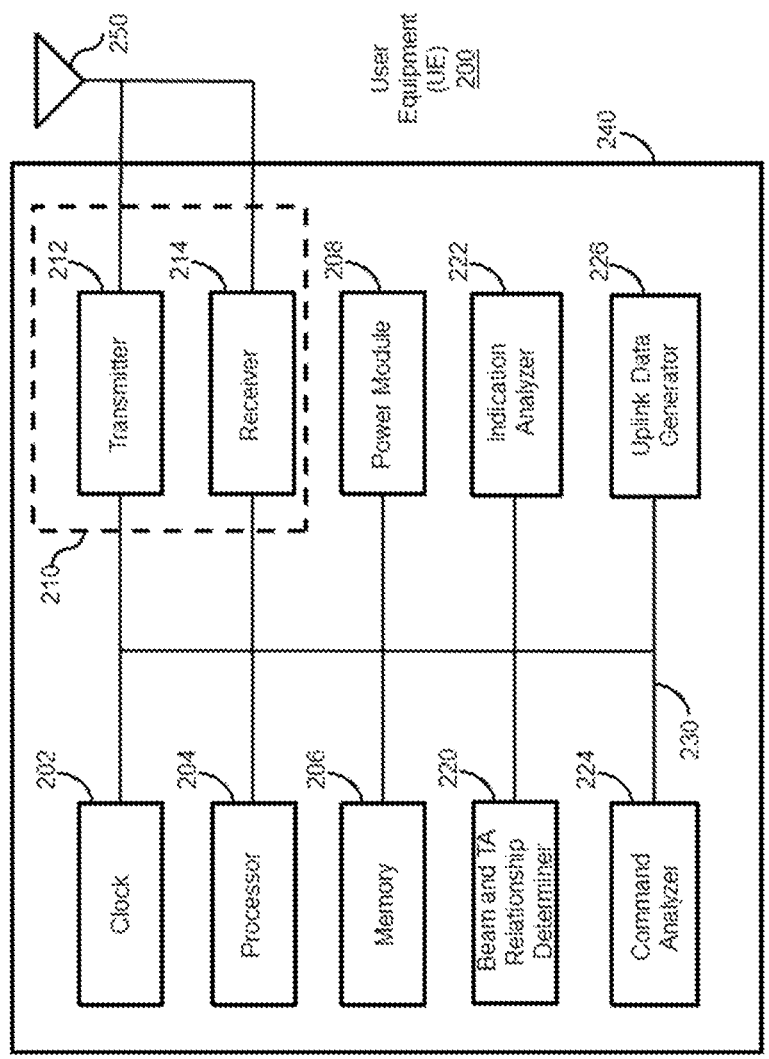
FIG. 2 illustrates a block diagram of a user equipment (UE), in accordance with some embodiments of the present disclosure.

FIG. 2 illustrates a block diagram of a UE 200, in accordance with some embodiments of the present disclosure. The UE 200 is an example of a device that can be configured to implement the various methods described herein. As shown in FIG. 2, the UE 200 includes a housing 240 containing a system clock 202, a processor 204, a memory 206, a transceiver 210 comprising a transmitter 212 and a receiver 214, a power module 208, a beam and TA relationship determiner 220, an indication analyzer 222, a command analyzer 224, and an uplink data generator 226.

In this embodiment, the system clock 202 provides the timing signals to the processor 204 for controlling the timing of all operations of the UE 200. The processor 204 controls the general operation of the UE 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the UE 200 to transmit data to and receive data from a remote device (e.g., a UE or another BS). An antenna 250 is typically attached to the housing 240 and electrically coupled to the transceiver 210. In various embodiments, the UE 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

The beam and TA relationship determiner 220 in this example may determine a first set of beam indications and a second set of timing advance command (TAC) values, e.g. based on a command or signaling from a BS. Each beam indication in the first set is associated with a respective TAC value in the second set. In one embodiment, each beam indication comprises at least one of: a sounding reference signal (SRS) resource set; a spatial relation information (SRI); a quasi co location (QCL) state; a transmission configuration indicator (TCI) state; a control resource set (CORESET); a control resource set (CORESET) pool; a non-zero-power channel state information reference signal (NZP-CSI-RS) resource set; an SRS port; and an antenna port. In another embodiment, each beam indication comprises at least one of: an antenna panel number and a beam group. In one example, the beam group comprises a group of beams that are transmitted to different transmission/reception points (TRPs) in a same serving cell. In another example, the beam group comprises a group of beams that are transmitted in different serving cells.

The indication analyzer 222 in this example may obtain, for an uplink transmission to the BS, an indication comprising a TAC value from the second set. In one embodiment, the indication indicates the TAC value and a TA indication associated with the TAC value. The TA indication may comprise at least one of: a TA group (TAG) associated with the TAC value, and a beam indication associated with the TAC value. In one embodiment, when the indication includes the beam indication, the TA indication comprises the beam indication associated with the TAC value. In another embodiment, when the indication does not include the beam indication, the TA indication comprises the TAG associated with the TAC value. According to various embodiments, the TAC value indicates at least one of: an absolute TAC value of the uplink transmission on a beam having a beam indication associated with the TAC value; and a relative TAC value of the uplink transmission on the beam compared to a preceding uplink transmission of the UE.

The command analyzer 224 in this example may receive, via the receiver 214 from the BS, commands with respect to uplink transmission of the UE. In one embodiment, the command analyzer 224 may receive, via the receiver 214 from the BS, a first command indicating: the first set of beam indications, the second set of TAC values, or a relationship between the two sets; and then receive, via the receiver 214 from the BS, a second command indicating the indication for the uplink transmission of the UE.

In another embodiment, the command analyzer 224 may receive, via the receiver 214 from the BS, a first command indicating: the first set of beam indications, the second set of TAC values, or a relationship between the two sets. Then, the command analyzer 224 may receive, via the receiver 214 from the BS, a second command activating: a first subset of beam indications in the first set and a second subset of TAC values in the second set, wherein each beam indication in the first subset is associated with a respective TAC value in the second subset. Then, the command analyzer 224 may receive, via the receiver 214 from the BS, a third command indicating the indication for the uplink transmission of the UE, wherein the TAC value in the indication is from the second subset. The command analyzer 224 may analyze these commands and provide the analysis results to the beam and TA relationship determiner 220, the indication analyzer 222, and/or the uplink data generator 226. The relationship between the two sets may be configured based on at least one of: a radio resource control (RRC) in the first command; a MAC control element (MAC CE) in the second command; and a downlink control information (DCI) in the third command.

The uplink data generator 226 in this example may determine, for the uplink transmission, a transmission time based on the TAC value; and transmit, at the transmission time, the uplink transmission to the BS, on a beam corresponding to a beam indication associated with the TAC value. In one embodiment, the uplink transmission comprises a transmission of at least one of: a physical uplink control channel (PUCCH); a physical uplink shared channel (PUSCH); and a sounding reference signal (SRS).

In one embodiment, the UE 200 may receive from a BS, e.g. by the indication analyzer 222 and/or the command analyzer 224, two TAC values, which include: a first TAC value for scheduling a former uplink transmission of the UE in a former time slot, and a second TAC value for scheduling a latter uplink transmission of the UE in a latter time slot. The first TAC value is different from the second TAC value. The former time slot and the latter time slot are two adjacent time slots and have an overlapping slot portion.

In one embodiment, the uplink data generator 226 may transmit, to the BS, an entire data of the latter uplink transmission in the latter time slot. The uplink data generator 226 may transmit, to the BS, a partial data of the former uplink transmission in the former time slot, but transmit no data of the former uplink transmission in the overlapping slot portion of the two time slots.

In another embodiment, the former uplink transmission comprises PUCCH or SRS in the overlapping slot portion. In this case, the uplink data generator 226 may transmit, to the BS, an entire data of the former uplink transmission in the former time slot, but not transmit any data of the latter uplink transmission.

In yet another embodiment, the former uplink transmission comprises PUSCH in the overlapping slot portion. In this case, the uplink data generator 226 may transmit, to the BS, an entire data of the latter uplink transmission in the latter time slot, but not transmit any data of the former uplink transmission.

The power module 208 can include a power source such as one or more batteries, and a power regulator, to provide regulated power to each of the above-described modules in FIG. 2. In some embodiments, if the UE 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the UE 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the beam and TA relationship determiner 220. Conversely, each of the modules illustrated in FIG. 2 can be implemented using a plurality of separate components or elements.

Figure 3:
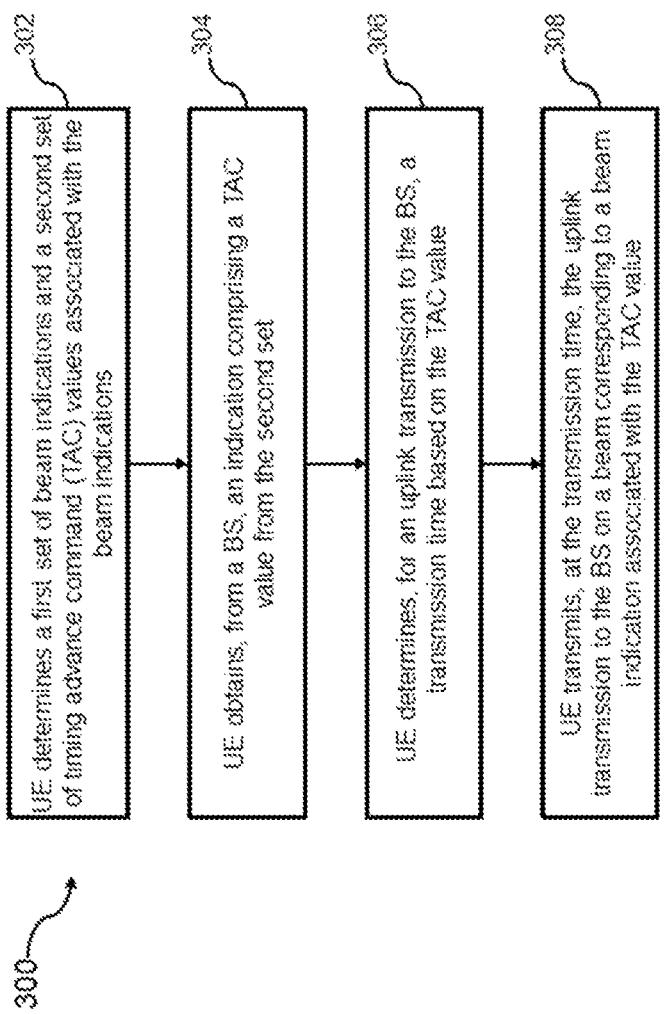
FIG. 3 illustrates a flow chart of a method performed by a UE for determining TA information, in accordance with some embodiments of the present disclosure.

FIG. 3 illustrates a flow chart for a method 300 performed by a UE, e.g. the UE 200 in FIG. 2, for determining TA information for uplink transmissions, in accordance with some embodiments of the present disclosure. At operation 302, the UE determines a first set of beam indications and a second set of timing advance command (TAC) values associated with the beam indications. At operation 304, the UE obtains, from a BS, an indication comprising a TAC value from the second set. At operation 306, the UE determines, for an uplink transmission to the BS, a transmission time based on the TAC value. At operation 308, the UE transmits, at the transmission time, the uplink transmission to the BS on a beam corresponding to a beam indication associated with the TAC value. The order of the operations shown in FIG. 3 may be changed according to different embodiments of the present disclosure.

Figure 4:
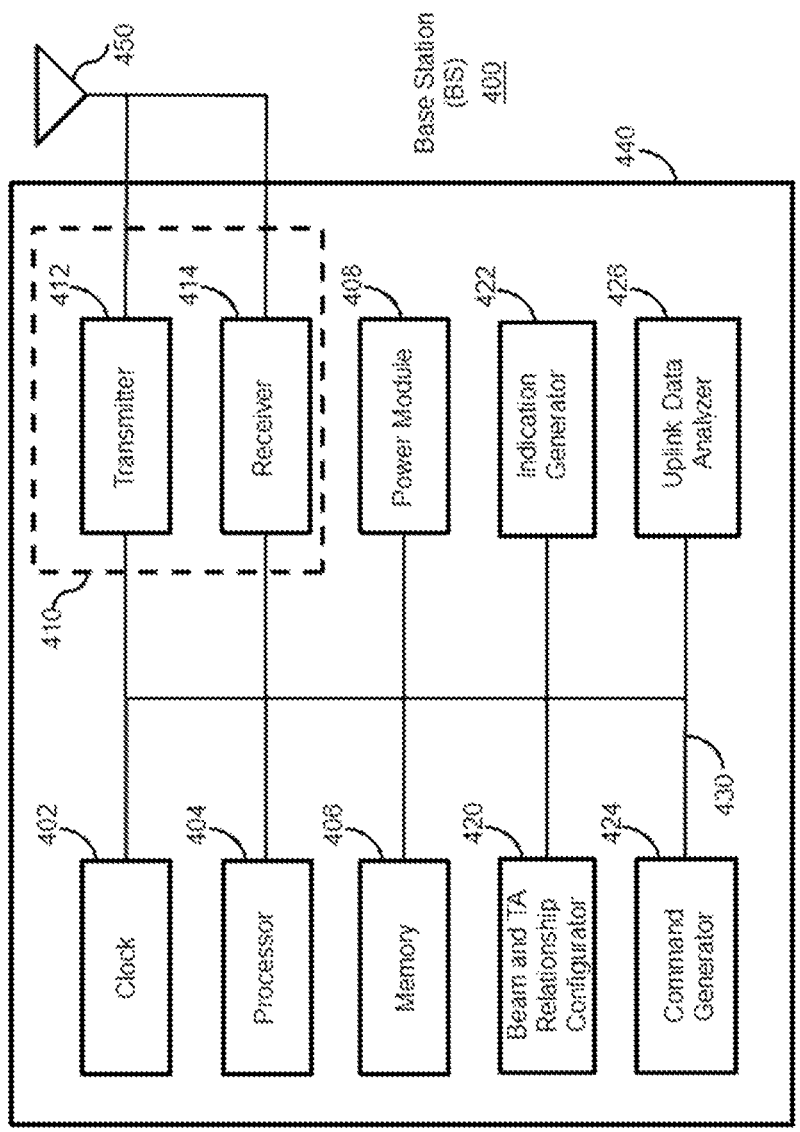
FIG. 4 illustrates a block diagram of a base station (BS), in accordance with some embodiments of the present disclosure.

FIG. 4 illustrates a block diagram of a base station (BS) 400, in accordance with some embodiments of the present disclosure. The BS 400 is an example of a device that can be configured to implement the various methods described herein. As shown in FIG. 4, the BS 400 includes a housing 440 containing a system clock 402, a processor 404, a memory 406, a transceiver 410 comprising a transmitter 412 and receiver 414, a power module 408, a beam and TA relationship configurator 420, an indication generator 422, a command generator 424, and an uplink data analyzer 426.

In this embodiment, the system clock 402, the processor 404, the memory 406, the transceiver 410 and the power module 408 work similarly to the system clock 202, the processor 204, the memory 206, the transceiver 210 and the power module 208 in the UE 200. An antenna 250 or a multi-antenna array 250 is typically attached to the housing 240 and electrically coupled to the transceiver 210.

In a wireless communication, the BS 400 is associated with at least one cell. In one embodiment, the beam and TA relationship configurator 420 in the BS 400 may configure a first set of beam indications and a second set of timing advance command (TAC) values for a UE. Each beam indication in the first set is associated with a respective TAC value in the second set. In one embodiment, each beam indication comprises at least one of: a sounding reference signal (SRS) resource set; a spatial relation information (SRI); a quasi co location (QCL) state; a transmission configuration indicator (TCI) state; a control resource set (CORESET); a control resource set (CORESET) pool; a non-zero-power channel state information reference signal (NZP-CSI-RS) resource set; an SRS port; and an antenna port. In another embodiment, each beam indication comprises at least one of: an antenna panel number and a beam group. In one example, the beam group comprises a group of beams that are transmitted to different transmission/reception points (TRPs) in a same serving cell. In another example, the beam group comprises a group of beams that are transmitted in different serving cells.

The indication generator 422 in this example may generate, for an uplink transmission of the UE, an indication comprising a TAC value from the second set. In one embodiment, the indication indicates the TAC value and a TA indication associated with the TAC value. The TA indication may comprise at least one of: a TA group (TAG) associated with the TAC value, and a beam indication associated with the TAC value. In one embodiment, when the indication includes the beam indication, the TA indication comprises the beam indication associated with the TAC value. In another embodiment, when the indication does not include the beam indication, the TA indication comprises the TAG associated with the TAC value. According to various embodiments, the TAC value indicates at least one of: an absolute TAC value of the uplink transmission on a beam having a beam indication associated with the TAC value; and a relative TAC value of the uplink transmission on the beam compared to a preceding uplink transmission of the UE.

The command generator 424 in this example may obtain the beam and TA relationship configured by the beam and TA relationship configurator 420 and the indication generated by the indication generator 422. The command generator 424 may generate and transmit, via the transmitter 412 to the UE, commands with respect to uplink transmission of the UE. In one embodiment, the command generator 424 may transmit, via the transmitter 412 to the UE, a first command indicating: the first set of beam indications, the second set of TAC values, or a relationship between the two sets; and then transmit, via the transmitter 412 to the UE, a second command indicating the indication for the uplink transmission of the UE.

In another embodiment, the command generator 424 may transmit, via the transmitter 412 to the UE, a first command indicating: the first set of beam indications, the second set of TAC values, or a relationship between the two sets. Then, the command generator 424 may transmit, via the transmitter 412 to the UE, a second command activating: a first subset of beam indications in the first set and a second subset of TAC values in the second set, wherein each beam indication in the first subset is associated with a respective TAC value in the second subset. Then, the command generator 424 may transmit, via the transmitter 412 to the UE, a third command indicating the indication for the uplink transmission of the UE, wherein the TAC value in the indication is from the second subset. The relationship between the two sets may be configured based on at least one of: a radio resource control (RRC) in the first command; a MAC control element (MAC CE) in the second command; and a downlink control information (DCI) in the third command.

The uplink data analyzer 426 in this example may receive, via the receiver 414, an uplink transmission from the UE. The uplink transmission is transmitted on a beam corresponding to a beam indication associated with the TAC value, and transmitted at a time determined based on the TAC value. In one embodiment, the uplink transmission comprises a transmission of at least one of: a physical uplink control channel (PUCCH); a physical uplink shared channel (PUSCH); and a sounding reference signal (SRS).

In one embodiment, the BS 400 may transmit to a UE, e.g. by the indication generator 422 and the command generator 424, two TAC values, which include: a first TAC value for scheduling a former uplink transmission of the UE in a former time slot, and a second TAC value for scheduling a latter uplink transmission of the UE in a latter time slot. The first TAC value is different from the second TAC value. The former time slot and the latter time slot are two adjacent time slots and have an overlapping slot portion.

In one embodiment, the uplink data analyzer 426 may receive, from the UE, an entire data of the latter uplink transmission in the latter time slot. The uplink data analyzer 426 may receive, from the UE, a partial data of the former uplink transmission in the former time slot, but receive no data of the former uplink transmission in the overlapping slot portion of the two time slots.

In another embodiment, the former uplink transmission comprises uplink control information (UCI) or sounding reference signal (SRS) in the overlapping slot portion. In this case, the uplink data analyzer 426 may receive, from the UE, an entire data of the former uplink transmission in the former time slot, but not receive any data of the latter uplink transmission.

In yet another embodiment, the former uplink transmission does not comprise UCI or SRS in the overlapping slot portion. In this case, the uplink data analyzer 426 may receive, from the UE, an entire data of the latter uplink transmission in the latter time slot, but not receive any data of the former uplink transmission.

The power module 408 can include a power source such as one or more batteries, and a power regulator, to provide regulated power to each of the above-described modules in FIG. 4. In some embodiments, if the BS 400 is coupled to a dedicated external power source (e.g., a wall electrical outlet), the power module 408 can include a transformer and a power regulator.

The various modules discussed above are coupled together by a bus system 430. The bus system 430 can include a data bus and, for example, a power bus, a control signal bus, and/or a status signal bus in addition to the data bus. It is understood that the modules of the BS 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the beam and TA relationship configurator 420. Conversely, each of the modules illustrated in FIG. 4 can be implemented using a plurality of separate components or elements.

Figure 5:
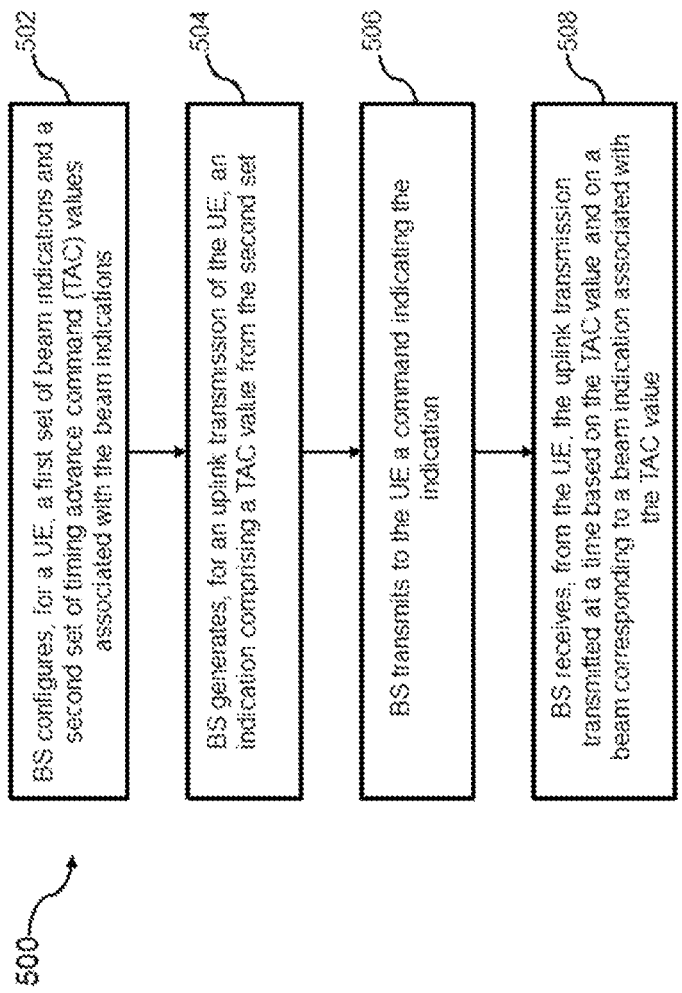
FIG. 5 illustrates a flow chart of a method performed by a BS for configuring timing advance (TA) information, in accordance with some embodiments of the present disclosure.

FIG. 5 illustrates a flow chart for a method 500 performed by a BS, e.g. the BS 400 in FIG. 4, for configuring TA information, in accordance with some embodiments of the present disclosure. At operation 502, the BS configures, for a UE, a first set of beam indications and a second set of timing advance command (TAC) values associated with the beam indications. At operation 504, the BS generates, for an uplink transmission of the UE, an indication comprising a TAC value from the second set. At operation 506, the BS transmits to the UE a command indicating the indication. At operation 508, the BS receives, from the UE, the uplink transmission transmitted at a time based on the TAC value and on a beam corresponding to a beam indication associated with the TAC value. The order of the operations shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

In one embodiment, the TA information includes two types of information: a TA tag/indication and a TA value. The TA indication may include a TAG, and the TA value may correspond to the adjustment value indicated in the TAC. According to different uplink signal transmission scenarios, TA information may be divided into the following two types.

According to various embodiments, the TA information indication method disclosed here can be applied to beams used by all uplink physical layer channels except PRACH, e.g. physical uplink shared channel (PUSCH), physical uplink control channel (PUCCH), sounding reference signal (SRS).

To achieve TA information indication at the level of uplink transmission beams (beam-specific), a signaling framework for a TA indication of a target beam may be designed according to any of the following two methods.

Figure 6:
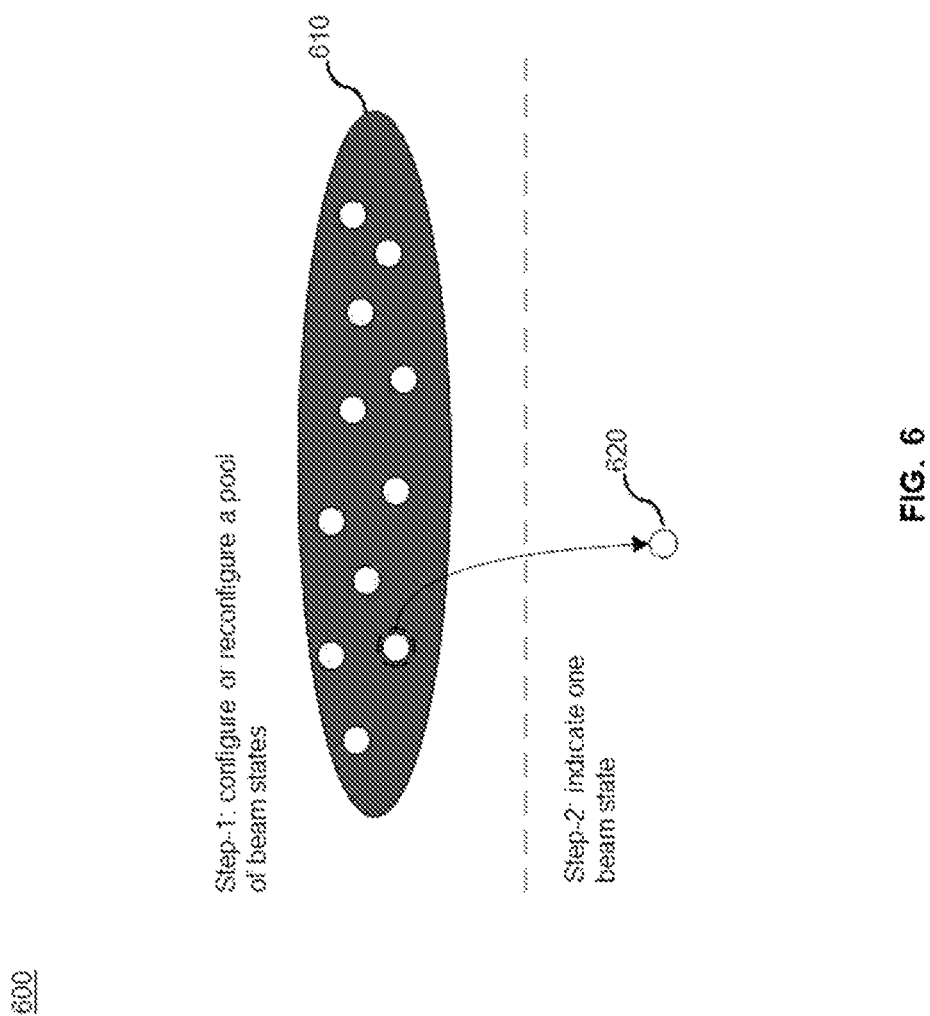
FIG. 6 illustrates an exemplary method for indicating beam indication(s), in accordance with some embodiments of the present disclosure.

In a first method 600, a two-layer architecture is used, as shown in FIG. 6. A first signaling or command may be used to indicate the states of multiple uplink beams, forming a beam state pool 610. The first signaling or command may be a radio resource control (RRC) or MAC CE. The beam state may refer to a beam indication which is one of: SRS resource set, SRI, QCL state, TCI state, CORESET, CORESET pool, NZP-CSI-RS resource set, antenna panel, beam group, SRS port, or antenna port. Each beam in the pool 610 is associated with a TA value that is also indicated in the first signaling or command. Based on this, a second signaling or command may be used to indicate the specific state corresponding to the target beam or target beam group 620, as shown in FIG. 6. The second signaling or command may be a MAC CE or downlink control information (DCI).

Figure 7:
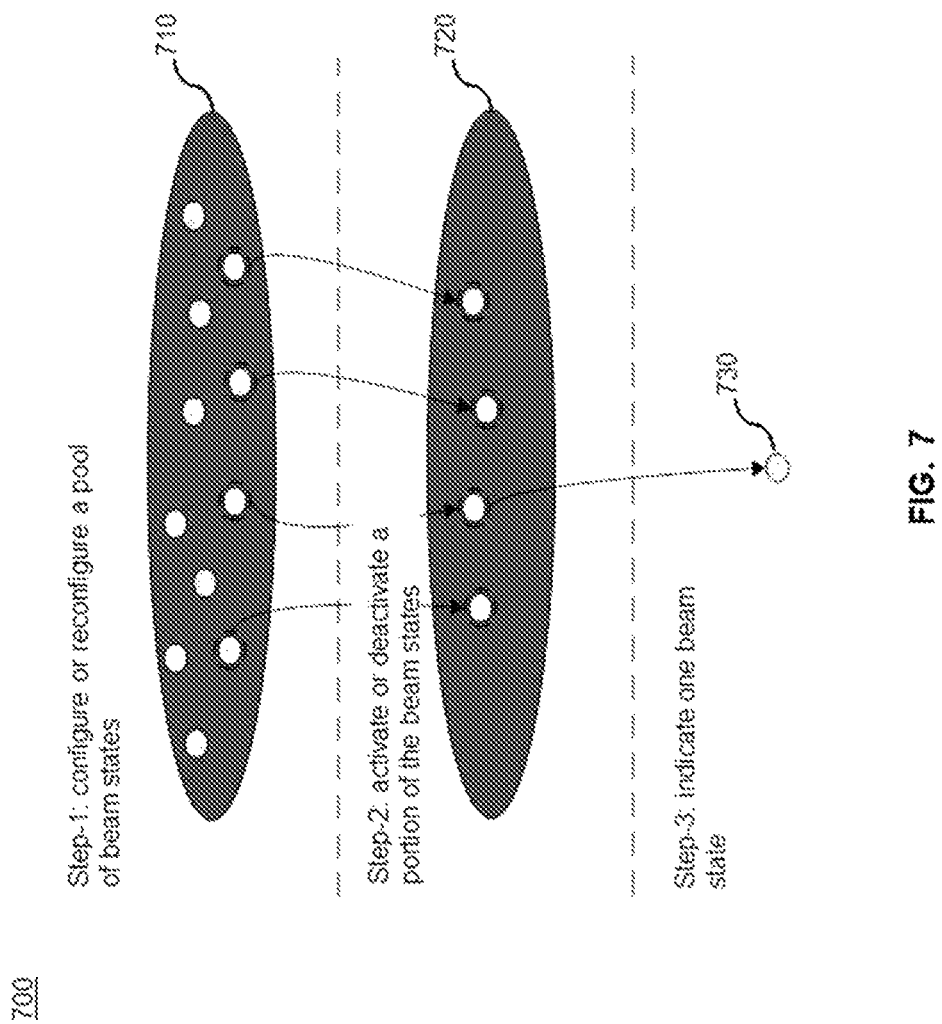
FIG. 7 illustrates another exemplary method for indicating beam indication(s), in accordance with some embodiments of the present disclosure.

In a second method 700, a three-layer architecture is used, as shown in FIG. 7. A first signaling or command may be used to indicate the states of multiple uplink beams, forming a beam state pool 710. The beam state may refer to a beam indication as discussed above in the first method 600. Each beam in the pool 710 is associated with a TA value that is also indicated in the first signaling or command. The first signaling or command may be a RRC in the second method 700. Then, a second signaling or command may be used to activate a subset 720 of the states in the pool 710, with their associated TA values. The second signaling or command may be a MAC CE in the second method 700. Finally, a third signaling or command may be used to indicate the specific state corresponding to the target beam or target beam group 730, as shown in FIG. 7. The third signaling or command may be a DCI.

Figure 8:
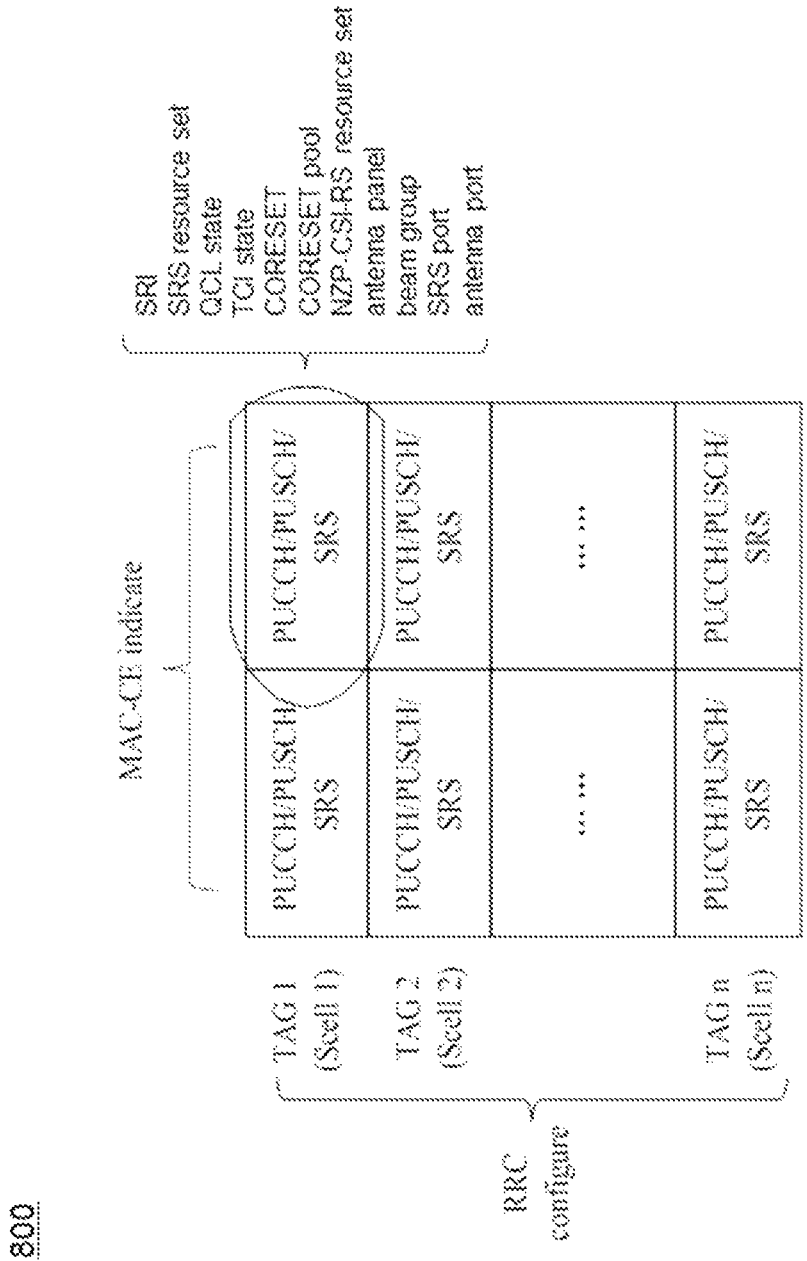
FIG. 8 illustrates an exemplary signaling framework for indicating TA information, in accordance with some embodiments of the present disclosure.

FIG. 8 illustrates an exemplary signaling framework 800 for indicating beam-specific TA information, in accordance with some embodiments of the present disclosure. In various embodiments of the present teaching, the beam state is equivalent to a beam. In various embodiments of the present teaching, the beam state may be at least one of the following: SRS resource set, SRI, QCL state, TCI state, CORESET, CORESET pool, NZP-CSI-RS resource set, antenna panel, beam group, SRS port or antenna port.

In various embodiments of the present teaching, the SRI indicates a spatial relationship containing one or more source reference signals (SRS), and is used to correlate the same or quasi co-location spatial relationship between: (a) the target channel (such as PUSCH/PUCCH) or the reference signal (SRS) and (b) the reference RSs.

In various embodiments of the present teaching, the QCL state is a quasi-co-location type of one or more source reference signals. Specifically, the "quasi-co-location type" includes one of the following: QCL-Type A, QCL-Type D. The QCL-Type A means that the target channel or reference signal has the same parameters for demodulation as the source reference signal, e.g. parameters about Doppler frequency shift, Doppler spread, average delay, delay spread. The QCL-Type D means that the target channel or reference signal has the same receive spatial filter as the source reference signal, which also means that the target channel or the reference signal has the same receive beam as the source reference signal.

In the following description, a wireless communication device may refer to a UE, a mobile device, an access terminal, a user terminal, a user station, a user unit, a mobile station, a remote station, a remote terminal, a user agent, a user device, etc. In the following description, a wireless communication node may refer to a base station, an AP (Access Point), Node B, RNC (Radio Network Controller), or eNB (Evolved Node B), BSC (Base Station Controller), BTS (Base Transceiver Station), BS (Based Station), TF (Transceiver Function), wireless circuit router, radio transceiver, basic service unit, extended service unit, RBS (Radio Base Station), etc.

In a first embodiment, a TA information indication method is disclosed based on PUSCH transmission beams. The TA information indication method for a PUSCH transmission beam may be applied to a wireless communication device. The method includes: receive timing advance (TA) information sent by the wireless communication node for a PUSCH transmission beam, and determining or adjusting a TAC value for the uplink PUSCH transmission beam based on the received TA information.

In this embodiment, the TA information corresponds to a PUSCH transmission beam or beam group. When the wireless communication device receives TA information for a PUSCH transmission beam, it uses the TA information on the transmission beam. The TA information includes a selected TA indication and a selected TAC value corresponding to the selected TA indication. The TA indications have a one-to-one mapping with the TAC values. The TA indication includes at least one of a TAG and a beam indication. The beam indication may be obtained by an indication command from the wireless communication node.

Further, the method may include at least one of the following: (a) when the beam indication is included in the signaling, the TA indication is the beam indication; and (b) when the beam indication is not included in the signaling, the TA indication is the TAG.

Further, the beam indication includes at least one of the following: (a) an uplink transmission beam indication, including at least one of: SRI, SRS resource set; (b) a unified downlink transmission beam indication, including at least one of: QCL state index, TCI state index, CORESET, CORESET pool, NZP-CSI-RS resource set; (c) an uplink transmission beam group indication, including at least one of: antenna panel, beam group; (d) a port indication, including at least one of: SRS port, antenna port.

The TA information indication command may include at least one of the following: RRC, MAC CE, RAR MAC, and a physical layer signaling. The physical layer signaling may include at least one of the following: PDCCH, DCI.

Further, the signaling indication method includes at least one of a two-step indication and a three-step indication. The two-step indication includes: the wireless communication node transmits to the wireless communication device a first command to configure the beam indications of multiple uplink transmission beams to form a beam state pool; and the wireless communication node transmits to the wireless communication device a second command to indicate the specific beam indication(s) of the transmission beam or beam group. The first command includes at least one of the following: RRC, MAC CE; and the second command includes at least one of the following: MAC CE, DCI.

The three-step indication includes the following. First, the wireless communication node transmits to the wireless communication device a first command to indicate the beam indications of multiple uplink transmission beams to form a beam state pool. Then, the wireless communication node transmits to the wireless communication device a second command to activate some beam indications in the pool. Finally, the wireless communication node transmits to the wireless communication device a third command to indicate the specific beam indication(s) of the transmission beam or beam group. The first command includes at least one of the following: RRC; the second command includes at least one of the following: MAC CE; and the third command includes DCI.

In various embodiments of the present teaching, the TA value includes at least one of the following: an absolute TAC value of a PUSCH transmission beam; and a relative TAC value of the PUSCH transmission beam compared to the preceding uplink transmission.

In a second embodiment, a TA information indication method is disclosed based on PUCCH transmission beams.

The TA information indication method for a PUCCH transmission beam may be applied to a wireless communication device. The method includes: receive timing advance (TA) information sent by the wireless communication node for a PUCCH transmission beam, and determining or adjusting a TAC value for the uplink PUCCH transmission beam based on the received TA information.

In this embodiment, the TA information corresponds to a PUCCH transmission beam or beam group. When the wireless communication device receives TA information for a PUCCH transmission beam, it uses the TA information on the transmission beam. The TA information includes a selected TA indication and a selected TAC value corresponding to the selected TA indication. The TA indications have a one-to-one mapping with the TAC values. The TA indication includes at least one of a TAG and a beam indication. The beam indication may be obtained by an indication command from the wireless communication node.

Further, the method may include at least one of the following: (a) when the beam indication is included in the command, the TA indication is a beam indication; and (b) when the beam indication is not included in the command, the TA indication is a TAG.

Further, the beam indication includes at least one of the following: (a) an uplink transmission beam indication, including at least one of: SRI, SRS resource set; (b) a downlink transmission beam indication, including at least one of: QCL state, TCI state, CORESET, CORESET pool, NZP-CSI-RS resource set; (c) an uplink transmission beam group indication, including at least one of: antenna panel, beam group; (d) a port indication, including at least one of: SRS port, antenna port.

The TA information indication command may include at least one of the following: RRC, MAC CE, RAR MAC, and a physical layer signaling. The physical layer signaling may include at least one of: PDCCH and DCI.

Further, the command indication method includes at least one of a two-step indication and a three-step indication. The two-step indication includes: the wireless communication node transmits to the wireless communication device a first command to configure the beam indications of multiple uplink transmission beams to form a beam state pool; and the wireless communication node transmits to the wireless communication device a second command to indicate the specific beam indication(s) of the transmission beam or beam group. The first command includes at least one of the following: RRC, MAC CE; and the second command includes at least one of the following: MAC CE, DCI.

The three-step indication includes the following. First, the wireless communication node transmits to the wireless communication device a first command to indicate the beam indications of multiple uplink transmission beams to form a beam state pool. Then, the wireless communication node transmits to the wireless communication device a second command to activate some beam indications in the pool. Finally, the wireless communication node transmits to the wireless communication device a third command to indicate the specific beam indication(s) of the transmission beam or beam group. The first command includes RRC; the second command includes MAC CE; and the third command includes DCI.

In various embodiments of the present teaching, the TAC value includes at least one of the following: an absolute TAC value of a PUCCH transmission beam; and a relative TAC value of the PUCCH transmission beam compared to the preceding uplink transmission.

In a third embodiment, a TA information indication method is disclosed based on SRS transmission beams. The TA information indication method for a SRS transmission beam may be applied to a wireless communication device. The method includes: receive timing advance (TA) information sent by the wireless communication node for a SRS transmission beam, and determining or adjusting a TAC value for the uplink SRS transmission beam based on the received TA information.

In this embodiment, the TA information corresponds to a SRS transmission beam or beam group. When the wireless communication device receives TA information for a SRS transmission beam, it uses the TA information on the transmission beam. The TA information includes a selected TA indication and a selected TAC value corresponding to the selected TA indication. The TA indications have a one-to-one mapping with the TA values. The TA indication includes at least one of a TAG and a beam indication. The beam indication may be obtained by an indication command from the wireless communication node.

Further, the method may include at least one of the following: (a) when the beam indication is included in the command, the TA indication is a beam indication; and (b) when the beam indication is not included in the command, the TA indication is a TAG.

Further, the beam indication includes at least one of the following: (a) an uplink transmission beam indication, including at least one of: SRI, SRS resource set; (b) a downlink transmission beam indication, including at least one of: QCL state, TCI state, CORESET, CORESET pool, NZP-CSI-RS resource set; (c) an uplink transmission beam group indication, including at least one of: antenna panel, beam group; (d) a port indication, including at least one of: SRS port, antenna port.

The TA information indication command may include at least one of the following: RRC, MAC CE, RAR MAC, and a physical layer signaling. The physical layer signaling may include at least one of: PDCCH and DCI.

Further, the command indication method includes at least one of a two-step indication and a three-step indication. The two-step indication includes: the wireless communication node transmits to the wireless communication device a first command to configure the beam indications of multiple uplink transmission beams to form a beam state pool; and the wireless communication node transmits to the wireless communication device a second command to indicate the specific beam indication(s) of the transmission beam or beam group. The first command includes at least one of the following: RRC, MAC CE; and the second command includes at least one of the following: MAC CE, DCI.

The three-step indication includes the following. First, the wireless communication node transmits to the wireless communication device a first command to indicate the beam indications of multiple uplink transmission beams to form a beam state pool. Then, the wireless communication node transmits to the wireless communication device a second command to activate some beam indications in the pool. Finally, the wireless communication node transmits to the wireless communication device a third command to indicate the specific beam indication(s) of the transmission beam or beam group. The first command includes RRC; the second command includes MAC CE; and the third command includes DCI.

In various embodiments of the present teaching, the TAC value includes at least one of the following: an absolute TAC value of a SRS transmission beam; and a relative TAC value of the SRS transmission beam compared to the preceding uplink transmission.

Figure 9:
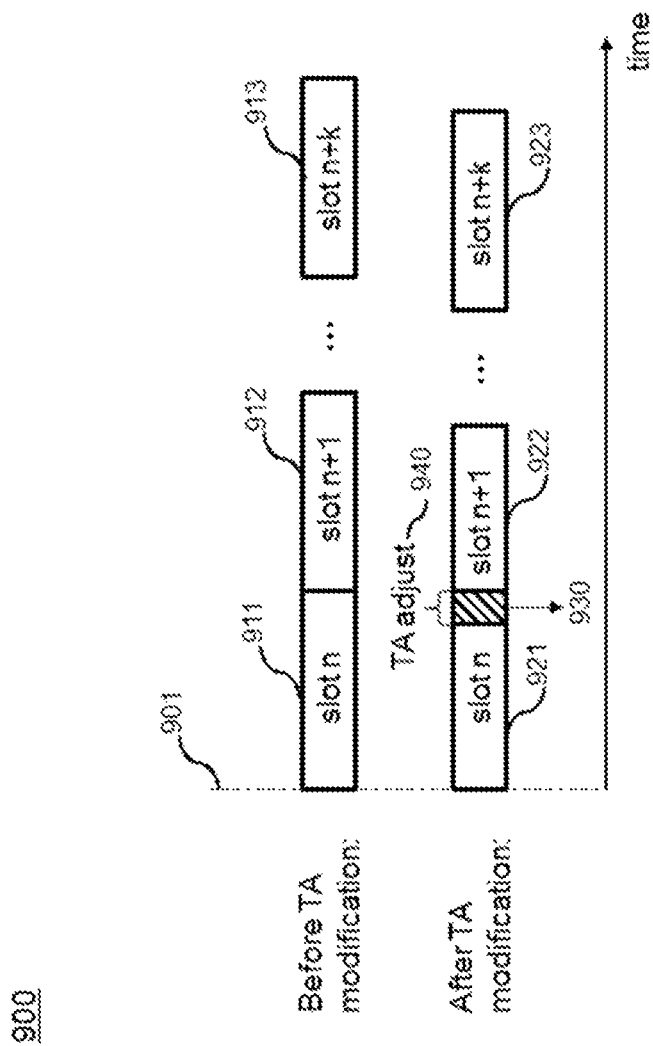
FIG. 9 illustrates an exemplary uplink transmission conflict caused by TA modification, in accordance with some embodiments of the present disclosure.

FIG. 9 illustrates an exemplary uplink transmission conflict 900 caused by TA modification, in accordance with some embodiments of the present disclosure. When a UE receives TA information from a base station and applies it to the subsequent adjustment of the transmission TA of the uplink signal, it may overlap with the former adjacent uplink signal without TA adjustment in the time domain, causing the uplink signal collision. As shown in FIG. 9, slot n 911 starts from a timing alignment baseline 901 in time domain. Before the TA modification, slot n 911, slot n+1 912 . . . slot n+k 913 are not overlapping. After the TA modification, slots starting from slot n+1 922 have an updated or adjusted TA, while slot n 921 still uses the old TA or unadjusted TA. As a result, the two adjacent slots, slot n 921 and slot n+1 922, have an overlapping slot portion 930 due to the TA adjustment 940, which causes a potential uplink transmission conflict. In an existing NR standard, to resolve this type of conflict, the UE sends the entire data in the former time slot n 921 without the TA adjustment, but does not send the overlapping uplink data of the time slot n+1 922 with the TA adjustment in the overlapping slot portion 930. This can be called "sacrifice latter to ensure former." However, the demodulation reference signal (DM-RS) is generally placed in the first three orthogonal frequency division multiplexing (OFDM) symbols in the transmission signal slot, and is used by the base station for demodulation of the uplink data in the slot. In addition, the uplink signal of slot n+1 922 uses TA adjustment during timing synchronization. Compared with the uplink signal of time slot n 921, the uplink signal of slot n+1 922 has better anti-interference ability and transmission quality due to the TA adjustment. Due to misalignment of uplink timing, the uplink signal of time slot n 921 may not be effectively decoded and used by the base station. As such, the uplink signal of slot n+1 922 should be completely reserved for transmission.

For this reason, the present teaching discloses a "sacrifice former to ensure latter" method to resolve this type of conflict. The UE does not send the overlapping part of data in the former time slot n without TA adjustment, but sends the entire data in the latter time slot n+1 922 with the TA adjustment. This can achieve the benefit that: the latter uplink signal has been adjusted by a new TA, which can better ensure that it is correctly received and used by the base station to improve the overall high-quality transmission of the uplink signal. The latter uplink signal has been adjusted by TA, which can better ensure that it is correctly received and used by the base station to improve the overall high-quality transmission of the uplink signal. First, the wireless communication device receives the TA information from the wireless communication node, and adjusts the TA of uplink transmission signals in the subsequent n time slots based on the TA information. When a TA-adjusted uplink signal partially overlaps in the time domain with a former adjacent uplink transmission signal without TA adjustment, causing a collision, the wireless communication device adopts the following method to resolve the uplink transmission conflict. The wireless communication device makes a corresponding reduction in the uplink transmission signal without TA adjustment in the former time slot, i.e. does not send data of the former uplink transmission in the overlapping slot portion; and sends the complete data of the latter uplink transmission with TA adjustment in the latter time slot including the overlapping slot portion.

In one embodiment, whether a "sacrifice latter to ensure former" mode or a "sacrifice former to ensure latter" mode is used, depends on the data content in the former uplink transmission of the two overlapping uplink transmissions. When the former uplink transmission comprises PUCCH or SRS in the overlapping slot portion, the wireless communication device may transmit, to the wireless communication node, an entire data of the former uplink transmission in the former time slot, but not transmit any data of the latter uplink transmission. When the former uplink transmission comprises PUSCH in the overlapping slot portion, the wireless communication device may transmit, to the wireless communication node, an entire data of the latter uplink transmission in the latter time slot, but not transmit any data of the former uplink transmission.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
   receiving, from a wireless communication node, a first command indicating: a first set of beam indications and a second set of timing advance command (TAC) values, wherein each beam indication in the first set is associated with a respective TAC value in the second set according to a mapping relationship;
   receiving, from the wireless communication node, a second command activating: a first subset of beam indications in the first set and a second subset of TAC values in the second set, wherein each beam indication in the first subset is associated with a respective TAC value in the second subset; and
   receiving, for an uplink transmission of the wireless communication device, from the wireless communication node, a third command comprising an indication for the uplink transmission of the wireless communication device, wherein the indication of the third command indicating a TAC value and the TAC value corresponding to the second subset.

2. The method of claim 1, wherein:
   the indication comprises the TAC value and a TA group (TAG) indication associated with the TAC value; and
   wherein:
   the TAG indication comprises at least one of: a TAG associated with the TAC value, or a beam indication associated with the TAC value.

3. The method of claim 1, wherein the mapping relationship of the first set of beam indications and the second set of TAC values is configured based on at least one of:
   a radio resource control (RRC) in the first command;
   a MAC control element (MAC CE) in the second command; or
   a downlink control information (DCI) in the third command.

4. The method of claim 1, wherein each beam indication comprises at least one of:
   a sounding reference signal (SRS) resource set;
   a spatial relation information (SRI);
   a quasi co location (QCL) state;
   a transmission configuration indicator (TCI) state;
   a control resource set (CORESET);
   a control resource set (CORESET) pool;
   a non-zero-power channel state information reference signal (NZP-CSI-RS) resource set;
   an SRS port;
   an antenna port;
   an antenna panel number; or
   a beam group, comprising at least one of:

a group of beams that are transmitted to different transmission/reception points (TRPs) in a same serving cell; or a group of beams that are transmitted in different serving cells.

5. The method of claim 1, wherein the TAC value indicates at least one of:

an absolute TAC value of the uplink transmission on a beam having a beam indication associated with the TAC value; or a relative TAC value of a new amount of a timing alignment for the uplink transmission on a beam compared to a current amount of the timing alignment for the uplink transmission on the beam of the wireless communication device.

6. The method of claim 1, further comprising:

determining, for the uplink transmission, a transmission timing adjustment based on the TAC value; or transmitting, based on the transmission timing adjustment, the uplink transmission to the wireless communication node on a beam corresponding to a beam indication associated with the TAC value.

7. The method of claim 1, wherein the uplink transmission comprises a transmission of at least one of:

a physical uplink control channel (PUCCH);

a physical uplink shared channel (PUSCH); or a sounding reference signal (SRS).

8. A method performed by a wireless communication device, the method comprising:

receiving, from a wireless communication node, a first TAC value associated with a first TAG used for a former uplink transmission of the wireless communication device;

receiving, from the wireless communication node, a second TAC value associated with a second TAG used for a latter uplink transmission of the wireless communication device, wherein:

the first TAG of the first TAC value is different from the second TAG of the second TAC value, and the former uplink transmission and the latter uplink transmission are overlapped in a time duration; and transmitting, the former uplink transmission, an entire data of the former uplink transmission, without transmitting any data of the latter uplink transmission that is within the overlapped time duration.

9. The method of claim 8, further comprising:

transmitting, to the wireless communication node, an entire data of the former uplink transmission, without transmitting any data of the latter uplink transmission, when the former uplink transmission comprises UCI or SRS in the overlapped time duration.

10. A method performed by a wireless communication node, the method comprising:

transmitting, to a wireless communication device, a first command indicating a first set of beam indications and a second set of timing advance command (TAC) values, wherein each beam indication in the first set is associated with a respective TAC value in the second set;

transmitting, to the wireless communication device, a second command activating a first subset of beam indications in the first set and a second subset of TAC values in the second set, wherein each beam indication in the first subset is associated with a respective TAC value in the second subset; and transmitting, for an uplink transmission of the wireless communication device, from the wireless communication node, a third command comprising an indication for the uplink transmission comprising a TAC value, wherein the indication of the third command indicating a TAC value and the TAC value corresponding to the second subset.

11. A wireless communication device configured to carry out the method of claim 1.

12. A wireless communication node configured to carry out the method of claim 10.

13. A non-transitory computer-readable medium having stored thereon computer-executable instructions for carrying out the method of claim 1.

14. A non-transitory computer-readable medium having stored thereon computer-executable instructions for carrying out the method of claim 8.

15. A non-transitory computer-readable medium having stored thereon computer-executable instructions for carrying out the method of claim 10.

16. A wireless communication node configured to carry out the method of claim 8.

* * * * *